United States Patent Office 3,728,294
Patented Apr. 17, 1973

3,728,294
METHOD OF BLENDING REINFORCING FIBERS AND MOLDING RESINS AND PRODUCT THEREOF
Marvin S. Levine, Hazel Crest, Ill., assignor to General American Transportation Corporation, Chicago, Ill.
No Drawing. Continuation of abandoned application Ser. No. 685,972, Nov. 27, 1967. This application Apr. 19, 1971, Ser. No. 135,449
Int. Cl. C08f 45/10
U.S. Cl. 260—29.1 B         5 Claims

ABSTRACT OF THE DISCLOSURE

There is disclosed a method of blending reinforcing fibers and thermoplastic molding resins, the molding mixture resulting therefrom being useful in injection molding and the like; the resin comprises from about 60 to about 93 parts by weight of the mixture and has a particle size in the range from about 125 mesh to about ⅛ inch, the fiber comprises from about 7 to about 40 parts by weight of the mixture and has a length in the range from about 125 mesh to about ½ inch, and a dispersant is provided in the mixture comprising from about 0.1 to about 0.5 part by weight of the mixture and being compatible with both the resin and the fiber and leaving substantially unchanged the nature of the molded compound formed thereform, the ratio by weight between the resin and the fiber being in the range from about 1.5:1 to about 15:1 and the ratio by weight between the dispersant and the fiber being in the range from about 1:200 to about 1:15; the fibers and the dispersant are mixed in a commercial blending machine for a time interval of from about 1 to about 3 minutes so as uniformly to disperse the dispersant on the surface of the fibers, and thereafter the resin is added thereto and the ingredients mixed for a time interval of from about 5 minutes to about 15 minutes to produce the molding mixture, whereby to provide a molding mixture wherein the resin and the fiber and the dispersant are thoroughly mixed and dispersed throughout the body of the mixture so as to maintain the resin and the fiber in a uniformly dispersed relationship during the storage of the molding mixture and during the handling and molding of the molding mixture into a molded compound.

---

This application is a continuation of application Ser. No. 685,972, filed Nov. 27, 1967 and now abandoned.

The present invention relates to the molding of fiber reinforced resin compounds, and particularly to a dry and free-flowing molding mixture for use in injection molding and the like, the molding mixture comprising a thermoplastic molding resin and a reinforcing fiber and a dispersant, and to the method of producing such a molding mixture.

It is an important object of the present invention to provide an improved dry and free-flowing molding mixture for use in injection molding and the like, the mixture including a thermoplastic molding resin and a reinforcing fiber and a dispersant, the resin comprising from about 60 to about 93 parts by weight of the mixture and having a particle size in the range from about 125 mesh to about ⅛ inch, the fiber comprising from about 7 to about 40 parts by weight of the mixture and having a length in the range from about 125 mesh to about ½ inch, the dispersant comprising from about 0.1 to about 0.5 part by weight of the mixture and being compatible with both the resin and the fiber and leaving substantially unchanged the nature of the molded compound formed therefrom, the ratio by weight between the resin and the fiber being in the range from about 1.5:1 to about 15:1 and the ratio by weight between the dispersant and the fiber being in the range from about 1:200 to about 1:15, the resin and the fiber and the dispersant being thoroughly mixed and dispersed throughout the body of the mixture so as to maintain the resin and the fiber in a uniformly dispersed relationship throughout the body of the mixture during the storage thereof and during the handling and molding thereof into a molded compound.

Another object of the invention is to provide a molding mixture of the type set forth wherein the resin is selected from the group of resins including polystyrene resins, polyethylene resins, polypropylene resins, styrene-acrylonitrile resins, acrylonitrile-butadiene-styrene resins, nylon resins, acetal resins and polycarbonate resins.

Another object of the invention is to provide a molding mixture of the type set forth wherein the reinforcing fiber is selected from the group including glass fibers, sisal fibers, and synthetic organic resin fibers.

Yet another object of the invention is to provide a molding mixture of the type set forth wherein the dispersant is a silicone fluid, such as a polymethyl siloxane, or a mineral oil.

A further object of the invention is to provide a preferred method of producing a molding mixture of the type set forth for use in injection molding and the like.

It has now been found that a dry and free-flowing molding mixture in accordance with the present invention can be produced by first mixing a reinforcing fiber and a suitable dispersant in a commercial blending machine for a time interval sufficient uniformly to disperse the dispersant on the surface of the fibers, and thereafter the resin is added thereto and the ingredients mixed for an additional suitable time interval to produce the molding mixture, wherein the resin and the fiber and the dispersant are uniformly dispersed throughout the body of the mixture so as to maintain the resin and the fiber in a uniformly dispersed relationship during the storage of the molding mixture and during the handling and molding of the molding mixture into a molded compound.

The thermoplastic molding resin may be selected from all of those resins which are commonly used in injection molding and the like, and specifically may be selected from the group including polystyrene resins, polyethylene resins, polypropylene resins, styrene-acrylonitrile resins, acrylonitrile-butadiene-styrene resins, nylon resins, acetal resins and polycarbonate resins. The particle size of the resin is preferably in the range from about 125 mesh to about ⅛ inch, a preferred particle size being 50 mesh resin powder. In the molding mixture, the resin may comprise from about 60 to about 93 parts by weight thereof, a preferred amount being 80 parts by weight thereof.

The reinforcing fiber may be selected from those reinforcing fibers that are commonly used in reinforcing resins used in injection molding and the like, and specifically may be selected from the group including glass fibers, sisal fibers and fibers formed of thermoset synthetic organic resins, such as polyester resins, and the like. The length of the reinforcing fibers is preferably in the range from about 125 mesh to about ½ inch. In a molding mixture, the reinforcing fibers may comprise from about 7 to about 40 parts by weight thereof, a preferred amount being 20 parts by weight thereof.

The dispersant used in forming the molding mixture of the present invention must be compatible with both the resin and the fiber and must leave substantially unchanged the nature of the molded compound formed therefrom. In the molding mixture, the dispersant may comprise from about 0.1 to about 0.5 part by weight. A preferred class of dispersants are the silicone fluids, for example the silicone fluid sold under the designation "DC-200." Another preferred class of dispersants is mineral oil. The dispersant serves to maintain the resin and the fiber in a uniformly dispersed relationship throughout the body of the molding mixture during the storage of the molding mixture and during the handling and molding of the molding mixture into a molded compound. It further is pointed out that the amount of dispersant in the molding mixture is relatively small, whereby the molding mixture is essentially dry to the touch, is free-flowing, and can be readily handled and transferred during the loading thereof into the molding equipment.

In the molding mixture, the ratio by weight between the molding resin and the reinforcing fiber is preferably in the range from about 1.5:1 to about 15:1, the preferred ratio being about 4:1. The ratio by weight between the dispersant and the reinforcing fiber is preferably in the range from about 1:200 to about 1:15, the preferred ratio being about 1:80.

The following is an example of the method of blending the reinforcing fibers and molding resins to provide a molding mixture in accordance with the present invention, it being understood that this example and the following examples are for illustrative purposes only and are not intended to limit the scope of the invention.

EXAMPLE 1

There were added to a double cone blender 20 parts by weight of glass fibers, ⅛ inch long. The blender was set in motion and 0.25 part by weight of a dispersant in the form of a "DC–200" silicone fluid was metered into the blender. The blending action was continued for 2 minutes, after which the blender was stopped and 80 parts by weight of styrene-acrylonitrile molding resin, 50 mesh, were added. The blender was again set in motion and the blending continued for 10 minutes to produce a dry and free-flowing molding mixture in accordance with the present invention, the molding mixture containing the following proportions of the ingredients:

| Ingredients: | Parts by weight |
| --- | --- |
| Styrene-acrylonitrile molding resin, 50 mesh | 80 |
| Glass fibers, ⅛ inch long | 20 |
| Dispersant, silicone fluid "DC–200" | 0.25 |

It was found that the molding mixture produced as above is dry to the touch, is free-flowing and will not clog or form undesirable lumps during storage and handling. Even more importantly, the molding resin and the reinforcing fiber are thoroughly dispersed throughout the resultant molding mixture, and are maintained in this uniformly dispersed relationship during the storage of the molding mixture and during the handling and the molding of the molding mixture into a molded compound.

The molding mixture of Example 1 was then fed to a 60-oz. single-screw injection molding machine and there was molded therefrom an automobile dash panel. It was found that the presence of the dispersant in the molding mixture in no way adversely affected the properties of the molded compound in the molded part thus produced.

It was found that the molding mixture of Example 1 could be handled extensively as in the packing and storage thereof, and as in the feeding thereof into the injection molding machine, all without effecting any separation or stratification between the molding resin on the one hand and the reinforcing fibers on the other. This is an entirely unexpected result inasmuch as the styrene-acrylonitrile molding resin has a specific gravity in the range from about 1.05 to about 1.08, whereas the glass fibers have a specific gravity of about 2.58. This wide disparity in the specific gravity between the molding resin on the one hand and the glass fiber on the other hand would tend quickly to separate and stratify these two materials if the dispersant were not present as described above with respect to Example 1. The difference in the particle size of the two ingredients also tends to encourage settling or stratification of one with respect to the other during the handling and storage thereof. Despite the above-noted wide discrepancy in the specific gravities of the ingredients and despite the wide differences in the particle sizes, it was found that the molding mixture formulated as in Example 1 in fact remained thoroughly dispersed and of uniform composition throughout the body thereof during the extensive handling and prolonged storage as evidenced by a random sampling of the mixture and a microscopic examination of the samples. Other samples were examined by dissolving the resin in a solvent therefor and weighing the remaining glass fibers to verify the proportions between the resin and the glass fibers in several samples taken from the body of the molding mixture.

It was found that the first step of adding the dispersant to the reinforcing fibers before the addition of the molding resin thereto is most important, it being apparent that the dispersant is spread along the surface of the reinforcing fibers substantially uniformly during this first mixing step. When the molding resin is added to the reinforcing fibers coated with the dispersant, the fibers tend to become mechanically and physically attached to one or more of the molding resin particles, thus to maintain the good dispersed relationship of the molding resin and the reinforcing fiber with respect to each other.

In Example 1, the moldnig resin may be any suitable thermoplastic molding resin useful in injection molding and the like, but it is preferably selected from those molding resins including the polystyrene resins, both high density and low density polyethylene resins, the polypropylene resins, the styrene-acrylonitrile resins, such as in Example 1, the acrylonitrile-butadiene-styrene resins, the nylon resins, the acetal resins, the polycarbonate resins, and the like. A very broad range of resin particle size and resin particle shape can be accommodated in the present invention, and in fact any particle size from about 125 mesh to about ⅛ inch cube is useful. The form of the resin may be beads, platelets, lumps, and the like, some of which are entirely irregular in shape and actually a mixture of sizes and shapes. In the resultant molding mixture, the resin may comprise as little as 60 percent by weight of the formulation and up to as much as 93 parts by weight of the formulation of Example 1. As noted above, the styrene-acrylonitrile molding resin of Example 1 has a specific gravity in the range from about 1.05 to about 1.08. It will be understood, however, that the specific gravity of the molding resin used may vary, polypropylene, for example, having a specific gravity in the range from about 0.89 to about 0.91.

The glass fibers of Example 1 are preferably formed by cutting rovings into ⅛ inch lengths, a typical glass fiber strand having a diameter of 0.00037, and as pointed out above may have a specific gravity of 2.58. The glass fibers in the formulation of Example 1 may comprise as little as 7 parts by weight thereof and up to as many as 40 parts by weight thereof. The length of the glass fibers may also vary from as little as 125 mesh to as long as ½ inch, the preferred lengths being ⅛ inch and ¼ inch. Other reinforcement fibers may be used in place of the glass fibers, for example, sisal fibers which have a specific gravity of about 1.0 and preferably are utilized in lengths of about ¼ inch, although the above-noted range of lengths for glass fibers may also be used for sisal fibers. Synthetic fibers such as those of synthetic organic thermosetting resins may be utilized, a typical such fiber being a polyester resin fiber having a specific gravity in the range from about 1.1 to about 1.2. The length of the polyester fiber may also be in the range from about 125 mesh to about ½ inch, a typical length being ⅛ inch.

In the formulation of Example 1, the silicone fluid may comprise as little as 0.1 part by weight of the formulation and up to as much as 0.5 part by weight of the formulation. The "DC–200" silicone fluid of Example 1 is a polymethyl siloxane which has a viscosity at 25° C. of 350 centistokes. It will be understood that other polymethyl siloxanes may be used including those having viscosities at 25° C. in the range from about 100 centistokes to about 1,000 centistokes. Yet other silicone fluids may be utilized, as well as other dispersants, such as mineral oil. The only requirements are that the dispersant wet the fiber and wet the resin, but not dissolve the resin, i.e., have only a very limited solubility for the resin, all while having the ability to maintain the resin and the fiber in a uniformly dispersed relationship. In addition, the dispersant must not impair the properties of the molded compound formed from the molding mixture, i.e., the dispersant must not cause the impairment of or change the values of the physical properties for the molded compound in an undesirable manner.

Any suitable commercial mixing and blending apparatus may be utilized to mix the fiber and the dispersant and then the resin and the dispersant treated fiber. In place of the double cone blender utilized in Example 1, a drum tumbler, or a ribbon blender, or the like, could be used. The time for mixing the dispersant and the reinforcing fiber may be substantially varied, and as little as one minute of mixing and as much as 3 minutes of mixing would be satisfactory. Likewise, the time required for blending the resin and the dispersant treated fiber can vary from that given in Example 1, and more specifically, that mixing time could be as little as 5 minutes or as much as 15 minutes. With regard to the two mixing times noted, if the mixing times are too short, the desired dispersing of the ingredients is not obtained, whereas on the other hand if the mixing time is too long, the glass fibers will break up, and thus perhaps adversely affect the physical properties of the resultant molded compound.

The molding mixture in Example 1 is useful in making a wide variety of articles, and in addition to the automobile dash panel described in Example 1, the molding mixture may be used to mold battery cases, clothes washer shrouds, clothes washer tubs, components for seating, and the like. Other types of molding equipment may likewise be used in place of the 60-oz. injection molding machine illustrated in Example 1.

In Example 1 above, the ratio of the molding resin to the reinforcing fibers is 4:1. In accordance with the present, it has been found that the ratio by weight between the molding resin and the reinforcing fibers should be in the range from about 1.5:1 to about 15:1, whereby to provide useful molding mixtures. The ratio between the dispersant and the reinforcing fibers in Example 1 is 1:80, and it has been found that this ratio should be maintained in the range from about 1:200 to about 1:15 in order to provide sufficient dispersant to maintain the molding resin and the reinforcing fibers in the uniformly dispersed relationship, all while applying a small enough amount of the dispersant so that the resultant molding mixture remains essentially dry and free-flowing.

In addition to the injection molding described above, it will be understood that the molding mixture of the present invention is also useful in other molding methods including blow molding, extrusion molding, and the like.

The following is an example of the use of a different type of mixing apparatus and different proportions among the ingredients to provide another molding mixture utilizing the same type of ingredients as in Example 1.

EXAMPLE 2

There were added to a ribbon blender 40 parts by weight of glass fibers formed by chopping rovings to a particle size of 125 mesh. The blender was set in motion and 1.0 part by weight of a "DC–200" silicone fluid was metered into the blender. The blending action was continued for 1 minute, after which the blender was stopped and 60 parts by weight of styrene-acrylonitrile molding resin, 125 mesh, were added. The blender was again set in motion and the blending continued for 5 minutes to produce a dry and free-flowing molding mixture in accordance with the present invention, the molding mixture containing the following proportions of ingredients:

| Ingredients: | Parts by weight |
|---|---|
| Styrene-acrylonitrile molding resin, 125 mesh | 60 |
| Glass fibers, 125 mesh | 40 |
| Dispersant, silicone fluid "DC–200" | 1.0 |

It was found that the molding mixture produced, as above is dry to the touch, is free-flowing and will not clog or form undesirable lumps during storage and handling. The molding resin and the reinforcing fiber were found to be thoroughly dispersed throughout the molding mixture, and further were maintained in this uniformly dispersed relationship during the storage of the molding mixture and during the handling and molding of the molding mixture into a molded compound.

The molding mixture of Example 2 was then fed to an injection molding machine and there was molded therefrom a clothes washer shroud. It was found that the presence of the dispersant in the molding mixture in no way adversely affected the properties of the molded compound in the molded part thus produced.

The following is another example wherein the fundamental ingredients of Example 1 have indifferent particle sizes and different proportions by weight, the ingredients being mixed to provide a molding mixture in accordance with the present invention.

EXAMPLE 3

To a drum tumbler were added 5 parts by weight of glass fibers, ½ inch long, and there was metered into the tumbler 0.1 part by weight of a dispersant in the form of a "DC–200" silicone fluid. The blending action was continued for 3 minutes, after which the blender was stopped and 95 parts by weight of styrene-acrylonitrile molding resin, ⅛ inch cube, were added. The blender was again set in motion and the blending continued for 15 minutes to produce a dry and free-flowing molding mixture in accordance with the present invention, the molding mixture containing the following proportions of the ingredients:

| Ingredients: | Parts by weight |
|---|---|
| Styrene-acrylonitrile, ⅛ inch cube | 95 |
| Glass fibers, ½ inch long | 5 |
| Dispersant, silicone fluid "DC–200" | 0.1 |

It was found that the molding mixture produced as above is dry to the touch, is free-flowing and will not clog or form undesirable lumps during storage and handling. It also was found that the molding resin and the reinforcing fiber are thoroughly dispersed throughout the molding mixture and are maintained in this uniformly dispersed relationship during the storage of the molding mixture and during the handling and molding of the molding mixture into a molded compound.

The molding mixture of Example 3 was then fed to an injection molding machine and there was molded therefrom a battery case. It was found that the presence of the dispersant in the molding mixture in no way adversely affected the properties of the molded compound in the molded part thus produced.

The following is an example of the use of mineral oil as a dispersant in the molding mixture in place of the silicone fluid of Examples 1 to 3 above.

EXAMPLE 4

There were added to a double cone blender 20 parts by weight of glass fibers, ⅛ inch long. The blender was set in motion and 0.25 part by weight of a dispersant in the form of mineral oil was metered into the blender. The blending action was continued for 2 minutes, after which the blender was stopped and 80 parts by weight of styrene-acrylonitrile molding resin, 50 mesh were added. The blender was again set in motion and the blending continued for 10 minutes to produce a dry and free-flowing molding mixture in accordance with the present invention, the molding mixture containing the following proportions of the ingredients:

| Ingredients: | Parts by weight |
|---|---|
| Styrene-acrylonitrile molding resin, 50 mesh | 80 |
| Glass fibers, ⅛ inch long | 20 |
| Dispersant, mineral oil | 0.25 |

It was found that the molding mixture produced as above is dry to the touch, is free-flowing and will not clog or form undesirable lumps during storage and handling. The molding resin and the reinforcing fiber are thoroughly dispersed throughout the resultant molding mixture, and are maintained in this uniformly dispersed relationship during storage of the molding mixture and during the handling and molding of the molding mixture into a molded compound.

The molding mixture of Example 4 was then fed to an injection molding machine and there was molded therefrom a clothes washer tub. It was found that the presence of the dispersant in the molding mixture in no way adversely affected the properties of the molded compound in the molded part thus produced.

The mineral oil used in Example 4 was that commonly known as "white mineral oil" and is more particularly the "light" oil having a density in the range from about 0.83 to about 0.86. The mineral oil is colorless, oily, tasteless and odorless, insoluble in water or alcohol, and soluble in benzene, chloroform, ether, carbon disulfide and petroleum ether. The so-called "heavy" white mineral oil may also be utilized, this mineral oil having a density in the range from about 0.87 to about 0.91. The parts by weight of the mineral oil in Example 4 may be varied from about 0.1 to about 0.5, and the ratio between the mineral oil and the reinforcing fibers may be in the range from about 1:200 to about 1:15, this ratio in Example 4 being 1:80. Other types of mineral oils may also be utilized so long as they meet the other requirements of the dispersant set forth hereinabove.

The following is an example of the use of another reinforcing fiber in the formulation of Example 1.

EXAMPLE 5

There were added to a double cone blender 20 parts by weight of sisal, ¼ inch long. The blender was set in motion and 0.25 part by weight of a dispersant in the form of "DC–200" silicone fluid was measured into the blender. The blending action was continued for 2 minutes, after which the blender was stopped and 80 parts by weight of styrene-acrylonitrile molding resin, 50 mesh were added. The blender was again set in motion and the blending continued for 10 minutes to produce a dry and free-flowing molding mixture in accordance with the present invention, the molding mixture containing the following proportions of the ingredients:

| Ingredients: | Parts by weight |
|---|---|
| Styrene-acrylonitrile, 50 mesh | 80 |
| Sisal, ¼ inch long | 20 |
| Dispersant, silicone fluid "DC–200" | 0.25 |

It was found that the molding mixture produced as above is dry to the touch, is free-flowing and will not clog or form undesirable lumps during storage and handling. The molding resin and the reinforcing sisal fibers are thoroughly dispersed throughout the resultant molding mixture, and are maintained in this uniformly dispersed relationship during the storage of the molding mixture and during the handling and molding thereof into a molded compound.

The molding mixture of Example 5 was then fed to a 60-oz. single-screw injection molding machine and there was molded therefrom a seat. It was found that the presence of the dispersant in the molding mixture in no way adversely affected the properties of the molded compound in the molded part thus produced.

The sisal in the molding mixture of Example 5 may comprise as little as 7 parts by weight thereof and up to as many as 40 parts by weight thereof, the length of the sisal being from about 125 mesh to about ½ inch. The specific gravity of the sisal is about 1.0, whereby there is less disparity between the specific gravity thereof and that of the molding resin than in the case of glass fibers. It will be understood that other natural fibers may be utilized instead of the sisal, sisal being simply an example of a natural organic reinforcing fiber useful in the present invention.

The following is an example of yet another reinforcing fiber useful in the formulation of Example 1.

EXAMPLE 6

There were added to a double cone blender 20 parts by weight of polyester fiber, ⅛ inch long. The blender was set in motion and 0.25 part by weight of a dispersant in the form of the "DC–200" silicon fluid was metered into the blender. The blending action was continued for 2 minutes, after which the blender was stopped and 80 parts by weight of styrene-acrylonitrile molding resin, 50 mesh, were added. The blender was again set in motion and the blending continued for 10 minutes to produce a dry and free-flowing molding mixture in accordance with the present invention, the molding mixture containing the following proportions of the ingredients:

| Ingredients: | Parts by weight |
|---|---|
| Styrene - acrylonitrile molding mixture, 50 mesh | 80 |
| Polyester fibers, ⅛ inch long | 20 |
| Dispersant, silicone fluid "DC–200" | 0.25 |

It was found that the molding mixture produced as above is dry to the touch, is free-flowing and will not clog or lump undesirable lumps during storage and handling. The molding resin and the reinforcing resin fiber are thoroughly dispersed throughout the resultant molding mixture, and are maintained in such uniformly dispersed relationship during the storage of the molding mixture and during the handling and molding of the molding mixture into a molded compound.

The molding mixture of Example 6 was then fed into an injection molding machine and there was molded therefrom an automobile instrument panel. It was found that the presence of the dispersant in the molding mixture in no way adversely affected the properties of the molded compound in the molded part thus produced.

It will be understood that the polyester fiber of Example 6 is simply illustrative of a synthetic organic plastic resin fiber that would be useful in the present invention. It is pointed out that the synthetic resin fibers must be thermosetting in character and must be able to withstand the injection molding temperatures and still retain the identity and integrity of the fibers if the fibers are to provide the desired reinforcing characteristics. The polyester reinforcing fiber of Example 6 has a specific gravity in the range from about 1.1 to about 1.2. The amount of the reinforcing polyester fiber in the composition of Example 6 may be as little as 7 parts by weight thereof and as many as 40 parts by weight thereof. The ratio between the molding resin and the reinforcing fibers is 4:1 in Example 6, the preferred range being from about 1.5:1 to about 15:1.

The following is an example of a different type of molding resin useful in the molding mixture of Example 1.

EXAMPLE 7

There were added to a double cone blender 20 parts by weight of glass fibers, ⅛ inch long. The blender was set in motion and 0.25 part by weight of a dispersant in the form of a "DC-200" silicone fluid was metered into the blender. The blending action was continued for 2 minutes, after which the blender was stopped and 80 parts by weight of a polystyrene molding resin, 3/32 inch pellet, were added. The blender was again set in motion and the blending continued for 10 minutes to produce a dry and free-flowing molding mixture in accordance with the present invention, the molding mixture containing the following proportions of the ingredients:

Ingredients: Parts by weight
Polystyrene molding resin, 3/32 inch pellet ____ 80
Glass fibers, 1/8 inch long _____ 20
Dispersant, silicone fluid "DC-200" _____ 0.25

It was found that the molding mixture produced as above is dry to the touch, is free-flowing and will not clog or form undesirable lumps during storage and handling. The molding resin and the reinforcing fibers are thoroughly dispersed throughout the resulting molding mixture, and are maintained in this uniformly dispersed relationship during the storage of the molding mixture and during the handling and molding of the molding mixture into a molded compound.

The molding mixture of Example 7 was then fed to an injection molding machine and there was molded therefrom the back panel of a portable TV set. It was found that the presence of the dispersant in the molding mixture in no way adversely affected the properties of the molded compound in the molded part thus produced.

It further was found that the proportions among the ingredients in Example 7 could be varied in the same manner as those for Example 1, and further that other particle sizes, other mixing apparatus, other fibers and other dispersants could be advantageously utilized therewith, all as exemplified above in Examples 2 through 6. It will be understood that the present invention can advantageously utilize a regular polystyrene molding resin, a premium polystyrene molding resin such as that sold under the designation "Dylene" KPD 60, a styrene-alpha-methyl styrene copolymer molding resin, a medium-impact polystyrene molding resin or a high-impact polystyrene molding resin.

The following are examples of the use of the invention as applied to molding mixtures including polyethylene molding resins.

EXAMPLE 8

There were added to a double cone blender 20 parts by weight of glass fibers, 1/8 inch long. The blender was set in motion and 0.25 part by weight of a dispersant in the form of a "DC-200" silicone fluid was metered into the blender. The blending action was continued for 2 minutes, after which the blender was stopped and 80 parts by weight of a low density polyethylene molding resin, 50 mesh, were added. The blender was again set in motion and the blending continued for 10 minutes to produce a dry and free-flowing molding mixture in accordance with the present invention, the molding mixture containing the following proportions of the ingredients:

Ingredients: Parts by weight
Low density polyethylene molding resin, 50
  mesh _____ 80
Glass fibers, 1/8 inch long _____ 20
Dispersant, silicone fluid "DC-200" _____ 0.25

It was found that the molding mixture produced as above is dry to the touch, is free-flowing and will not clog or form undesirable lumps during storage and handling. The molding resin and the reinforcing fiber are thoroughly dispersed throughout the resultant molding mixture, and are maintained in this uniformly dispersed relationship during the storage of the molding mixture and during the handling and molding of the molding mixture into a molded compound.

The molding mixture of Example 8 was then fed to an injection molding machine and there was molded therefrom a trash can. It was found that the presence of the dispersant in the molding mixture is no way adversely affected the properties of the molded compound in the molded part thus produced.

It will be understood that the various proportions may be changed among the ingredients in Example 8 in the manner explained above with respect to Example 1. Further, the particle size of the molding resin and the fiber, the type and amount of the dispersant, the type of reinforcing fiber and the type of mixing equipment utilized may all be varied as explained above with respect to Examples 2 through 6.

EXAMPLE 9

The procedure of Example 8 above was repeated but this time a high density polyethylene molding resin was substituted for the low density polyethylene resin. In all other respects the composition of the molding mixture and the method of making the same of Example 9 is identical to Example 8 above.

The following is an example of the use of yet another type of molding resin in the present invention.

EXAMPLE 10

There were added to a double cone blender 20 parts by weight of glass fibers, 1/8 inch long. The blender was set in motion and 0.25 part by weight of a dispersant in the form of a "DC-200" silicone fluid was metered into the blender. The blending action was continued for 2 minutes, after which the blender was stopped and 80 parts by weight of a polypropylene molding resin sold under the designation "Poly-Pro," 50 mesh, were added. The blender was again set in motion and the blending continued for 10 minutes to produce a dry and free-flowing molding mixture in accordance with the present invention, the molding mixture containing the following parts by weight of the ingredients:

Ingredients: Parts by weight
Polypropylene molding resin ("Poly-Pro"), 50
  mesh _____ 80
Glass fibers, 1/8 inch long _____ 20
Dispersant, silicone fluid "DC-200" _____ 0.25

It was found that the molding mixture produced as above is dry to the touch, is free-flowing and will not clog or form undesirable lumps during storage and handling. Even more importantly, the molding resin and the reinforcing fiber are thoroughly dispersed throughout the resultant molding mixture, and are maintained in this uniformly dispersed relationship during the storage of the molding mixture and during the handling and molding of the molding mixture into a molded compound.

The molding mixture of Example 10 was then fed to an injection molding machine and there was molded therefrom a valve casing. It was found that the presence of the dispersant in the molding mixture in no way adversely affected the properties of the molded compound in the molded part thus produced.

The proportions among the ingredients and the ratios thereamong may be varied as explained above with respect to Example 1. The particle size of the ingredients, the machinery for blending the ingredients, the types of reinforcing fibers and the types of dispersants may all be varied as illustrated in Examples 2 through 6 above. It is further pointed out that the polypropylene molding resin has a very low specific gravity, on the order of 0.89 to about 0.91, whereby the present invention is particularly useful when applied thereto due to the wide disparity between the specific gravity of the polypropylene molding resin and the specific gravity of the glass fibers.

The following is yet another example of the present invention applied to a different type of molding resin.

EXAMPLE 11

There were added to a double cone blender 20 parts by weight of glass fibers, ⅛ inch long. The blender was set in motion and 0.25 part by weight of a dispersant in the form of a "DC–200" silicone fluid was metered into the blender. The blending operation was continued for 2 minutes, after which the blender was stopped and 80 parts by weight of acrylonitrile-butadiene styrene resin, 50 mesh, were added. The blender was again set in motion and the blending continued for 10 minutes to produce a dry and free-flowing molding mixture in accordance with the present invention, the molding mixture containing the following proportions of the ingredients:

| Ingredients: | Parts by weight |
|---|---|
| Acrylonitrile-butadiene-styrene molding resin, 50 mesh | 80 |
| Glass fibers, ⅛ inch long | 20 |
| Dispersant, silicone fluid "DC–200" | 0.25 |

It was found that the molding mixture produced as above is dry to the touch, free-flowing and will not clog or form undesirable lumps during storage and handling. The molding resin and the reinforcing fiber are thoroughly dispersed throughout the resultant molding mixture, and are maintained in this uniformly dispersed relationship during the storage of the molding mixture and during the handling and the molding of the molding mixture into a molded compound.

The molding mixture of Example 11 was then fed to an injection molding machine and there was molded therefrom a seat. It was found that the presence of the dispersant in the molding mixture in no way adversely affected the properties of the molded compound in the molded part thus produced.

The acrylonitrile-butadiene-styrene molding resin utilized in Example 11 may be any of those sold under the trade designation "Lustran I," and particularly thus identified by further numerals 710, 720, 610, 620, 420, 210 and 220; those sold under the trade designation "Kralastic" and particularly those further identified by the suffixes "MH," "MHA," "MHB," and "K–2938"; and those sold under the trade designation "Cycolac" including those having the further identifying suffix "H," "GSM," "T," "X–27," "X–7" and "Cycolon AM"; and those sold under the trade designation "Abson 89015." It further will be understood that the molding resin may have the proportions thereof varied through the ranges described above with respect to Example 1. The type of reinforcing fiber may be varied as may the particle size thereof and the character and concentration of the dispersant, all as illustrated above with respect to Examples 2 through 6.

The following is an example of the use of polyamide resins in a molding mixture made in accordance with the present invention.

EXAMPLE 12

There were added to a double cone blender 20 parts by weight of glass fibers, ⅛ inch long. The blender was set in motion and 0.25 part by weight of a dispersant in the form of a "DC–200" silicone fluid was metered into the blender. The blending action was continued for 2 minutes, after which the blender was stopped and 80 parts by weight of a nylon-6,6 resin, 50 mesh, were added. The blender was again set in motion and the blending continued for ten minutes to produce a dry and free-flowing molding mixture in accordance with the present invention, the molding mixture containing the following proportions of the ingredients:

| Ingredients: | Parts by weight |
|---|---|
| Nylon-6,6 molding resin, 50 mesh | 80 |
| Glass fibers, ⅛ inch long | 20 |
| Dispersant, silicone fluid "DC–200" | 0.25 |

It was found that the molding mixture produced as above is dry to the touch, is free-flowing and will not clog or form undesirable lumps during storage and handling. The nylon molding resin and the reinforcing glass fibers are thoroughly dispersed throughout the resultant molding mixture, and are maintained in this uniformly dispersed relationship during the storage of the molding mixture and during the handling and the molding of the molding mixture into a molded compound.

The molding mixture of Example 12 was then fed to an injection molding machine and there was molded therefrom an electrical switch housing. It was found that the presence of the dispersant in the molding mixture in no way adversely affected the properties of the molded compound in the molded part thus produced.

It will be understood that different particle sizes and different proportions of the nylon molding resin may be utilized in the formulation of Example 12, such as those discussed above with respect to Example 1. In addition, other reinforcing fibers, other lengths of fibers, other proportions of the fibers, as well as other dispersants and proportions of dispersant may be utilized in Example 12, all as explained above with respect to Examples 2 through 6.

There is illustrated in Example 13 the use of an acetal molding resin to form a molding mixture in accordance with the present invention.

EXAMPLE 13

There were added to a double cone blender 20 parts by weight of glass fibers, ⅛ inch long. The blender was set in motion and 0.25 part by weight of a dispersant in the form of a "DC–200" silicone fluid was metered into the blender. The blending action was continued for 2 minutes, after which the blender was stopped and 80 parts by weight of an acetal molding resin sold under the trade designation as "Delrin 500," 50 mesh, were added. The blender was again set in motion and the blending continued for 10 minutes to produce a dry and free-flowing molding mixture in accordance with the present invention, the molding mixture containing the following proportions of the ingredients:

| Ingredients: | Parts by weight |
|---|---|
| Acetal molding resin, "Delrin 500," 50 mesh | 80 |
| Glass fibers, ⅛ inch long | 20 |
| Dispersant, silicone fluid "DC–200" | 0.25 |

It was found that the molding mixture produced as above is dry to the touch, is free-flowing and will not clog or form undesirable lumps during storage and handling. The acetal molding resin and the reinforcing glass fibers are thoroughly dispersed throughout the resultant molding mixture, and are maintained in this uniformly dispersed relationship during the storage of the molding mixture and during the handling and the molding of the molding mixture into a molded compound.

The molding mixture of Example 13 was then fed to an injection molding machine and there was molded therefrom a conveyor link. It was found that the presence of the dispersant in the molding mixture in no way adversely affected the properties of the molded compound in the molded part thus produced.

It will be understood that other types of acetal molding resins as well as other proportions thereof may be utilized in the formulation of Example 13, and specifically those variations discussed at length above with respect to Example 1. In addition, other reinforcing fibers, other lengths of reinforcing fibers, other dispersants and other proportions of the reinforcing fibers and dispersants can be utilized in the formulation of Example 13, all as explained above with respect to Examples 2 through 6.

The following is an example of still another molding mixture made in accordance with and embodying the principles of the present invention, this formulation employing a polycarbonate molding resin.

EXAMPLE 14

There were added to a double cone blender 20 parts by weight of glass fibers, ⅛ inch long. The blender was set in motion and 0.25 part by weight of a dispersant in the form of a "DC–200" silicone fluid was metered into the blender. The blending action was continued for 2 minutes, after which the blender was stopped and 80 parts by weight of polycarbonate molding resin sold under the trade designation "Lexan," 50 mesh, were added. The blender was again set in motion and the blending continued for 10 minutes to produce a dry and free-flowing molding mixture in accordance with the present invention, the molding mixture containing the following proportions of the ingredients:

| Ingredients: | Parts by weight |
| --- | --- |
| Polycarbonate molding resin, "Lexan," 50 mesh | 80 |
| Glass fibers, ⅛ inch long | 20 |
| Dispersant, silicone fluid "DC–200" | 0.25 |

It was found that the molding mixture produced as above is dry to the touch, is free-flowing and will not clog or form undesirable lumps during storage and handling. The polycarbonate molding resin and the reinforcing glass fibers are thoroughly dispersed throughout the resultant molding mixture, and are maintained in this uniformly dispersed relationship during the storage of the molding mixture and during the handling and the molding of the molding mixture into a molded compound.

The molding mixture of Example 14 was then fed to an injection molding machine and a switch rotor was molded therefrom. It was found that the presence of the dispersant in the molding mixture in no way adversely affected the properties of the molded compound in the molded part thus produced.

It will be understood that other types of polycarbonate molding resins and other proportions of the polycarbonate molding resin may be utilized in Example 14, such as the proportions described in discusisng Example 1 above. Likewise, other reinforcing fibers, other lengths of reinforcing fibers, other dispersants and other proportions of the reinforcing fibers and the dispersant may be utilized such as exemplified in Examples 2 through 6 above.

It further is pointed out that in each of Examples 1 through 14 above, dies, pigments, and other modifiers may be incorporated in the molding mixture if applied thereto in the dry state. In fact in the making of the specific molded parts illustrated above, a pigment is a highly desirable added ingredient in the molding mixture, these added ingredients in no way adversely affecting the above-mentioned highly desirable properties of the novel molding mixture of the present invention.

From the above it will be seen that there have been provided novel molding mixtures and novel methods of making those molding mixtures which fulfill all of the objects and advantages set forth above.

While there have been described what are at present considered to be the preferred embodiments of the invention, it will be understood that various modifications may be made therein, and it is intended to cover in the appended claims all such modifications as fall within the true spirit and scope of the invention.

I claim:

1. Procedure for preparing a dry and free-flowing molding mixture of a thermoplastic molding resin and a reinforcing fiber comprising mixing, for a period of time sufficient for complete dispersion:
    (1) from about 7 to about 40 weight percent of said mixture of a fiber selected from the group consisting of glass fibers and sisal fibers with
    (2) from about 0.1 to about 0.5 weight percent of said mixture of a dispersant that is compatible with both said resin and said fiber and which does not substantially change the nature of the compound formed therefrom and, thereafter, mixing the resulting composition with
    (3) from about 60 to about 93 weight percent of said mixture of a thermoplastic molding resin having a particle size of from about 125 mesh to about ⅛ inch until the resin and fiber are in a uniformly dispersed relationship, and
    (4) wherein said dispersant is selected from the group consisting of silicone oils and mineral oils.

2. The procedure of claim 1 wherein said dispersant is a polymethyl siloxane.

3. The procedure of claim 1 wherein said resin comprises about 80 weight percent of said mixture and has a particle size of about 50 mesh, said fiber is a glass fiber and comprises about 20 weight perecnt of said mixture and has a length of about ⅛ inch and said dispersant is a silicone oil and comprises about 0.25 weight percent of said mixture.

4. A molding mixture prepared by the procedure of claim 1.

5. A molding mixture prepared by the procedure of claim 2.

References Cited

UNITED STATES PATENTS

| | | | |
| --- | --- | --- | --- |
| 3,396,142 | 8/1968 | Little et al. | 260—41 |
| 2,981,980 | 2/1961 | Brown et al. | 264—108 |
| 3,454,691 | 8/1969 | Davis | 264—108 |

OTHER REFERENCES

"Glass Dispersions," vol. 51:6485d, 1957.

Schlich et al., "Critical Parameters for Direct Injection Molding of Glass-Fiber-Thermoplastic Powder Blends," May 1967.

Murphy, "Reinforced and Filled Thermoplastics," Indust. & Eng. Chem., vol. 58, No. 5, May 1966.

THEODORE MORRIS, Primary Examiner

U.S. Cl. X.R.

260—41 AG, 33.6 R, 33.6 PQ, 33.6 VA

UNITED STATES PATENT OFFICE
CERTIFICATE OF CORRECTION

Patent No. 3,728,294     Dated April 17, 1973

Inventor(s) MARVIN S. LEVINE

It is certified that error appears in the above-identified patent and that said Letters Patent are hereby corrected as shown below:

In the heading of column 1, lines 5 and 6, "General American Transportation Corporation, Chicago, Ill." should read -- United States Steel Corporation, Pittsburgh, Pa., a corporation of Delaware -- .

Signed and sealed this 8th day of January 1974.

(SEAL)
Attest:

EDWARD M. FLETCHER, JR.
Attesting Officer

RENE D. TEGTMEYER
Acting Commissioner of Patents